United States Patent [19]

Dörffel

[11] Patent Number: 4,731,434
[45] Date of Patent: * Mar. 15, 1988

[54] ALKYL ARYL KETONE/FORMALDEHYDE RESIN HAVING HIGH SOFTENING POINT

[75] Inventor: Jörg Dörffel, Marl, Fed. Rep. of Germany

[73] Assignee: Huels Aktiengesellschaft, Marl, Fed. Rep. of Germany

[*] Notice: The portion of the term of this patent subsequent to Sep. 17, 2002 has been disclaimed.

[21] Appl. No.: 628,537

[22] Filed: Jul. 6, 1984

[30] Foreign Application Priority Data

Jul. 6, 1983 [DE] Fed. Rep. of Germany ....... 3324287

[51] Int. Cl.$^4$ .............................................. C08G 2/30
[52] U.S. Cl. ................................... 528/227; 525/521
[58] Field of Search ......................... 528/227; 525/521

[56] References Cited

U.S. PATENT DOCUMENTS 2,191,802  2/1940  Novotny et al. ..................... 528/227
4,542,194  9/1985  Dorffel et al. ....................... 525/521

FOREIGN PATENT DOCUMENTS 0007106  7/1979  European Pat. Off. .
870022  1/1953  Fed. Rep. of Germany .
892975  9/1953  Fed. Rep. of Germany .
897484  10/1953  Fed. Rep. of Germany .
1595632  7/1970  France ............................. 528/227

Primary Examiner—Harold D. Anderson
Attorney, Agent, or Firm—Millen & White

[57] ABSTRACT

Condensation resins obtained by the polycondensation of alkyl aryl ketones and formaldehyde, wherein the polycondensation mixture contains 0.05 to 5% by weight, based on the alkyl aryl ketone, of an activator having the formula (A)

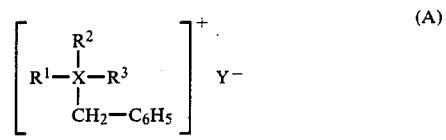

wherein X is a nitrogen or phosphorus atom; $R_1$, $R_2$ and $R_3$ are each independently a $C_{1-3}$-alkyl group or a phenyl group; and $Y^-$ is the anion of an inorganic or organic acid, have higher softening points than resins prepared by analogous processes but without the activator.

26 Claims, No Drawings

ALKYL ARYL KETONE/FORMALDEHYDE RESIN HAVING HIGH SOFTENING POINT

BACKGROUND OF THE INVENTION

The present invention relates to condensation resins obtained by the polycondensation of alkyl aryl ketones and formaldehyde and to a process for producing same in the liquid phase in the presence of basic catalysts at elevated temperatures.

Alkyl aryl ketone/formaldehyde resins have been known for a long time (DE-PS No. 892 975). According to that patent these resins are described as having softening points not exceeding about 80° C. Even those stated values are attained only if alcohols of low molecular weight are introduced into the polycondensation mixture. On the other hand, the addition of alcohols involves the disadvantage that the proportion of alkyl aryl ketone built into the resin is clearly reduced. Moreover, more recent determinations of the softening points (melting point/capillary method) on the resins reproduced according to the state of the art have shown that the softening points actually attained are 5° to 10° C. below the stated maximum values.

More recently, a process was described for manufacturing ketone resins having improved softening points (EP-PS No. 7 106). However, this process is restricted to (cyclo) aliphatic ketone resins. The improvement is attained by the addition of phase transfer catalysts to the polycondensation mixture. It is typical for such catalysts that in practical use they must comprise a crown ether or a substituent having a very long alkyl chain which may where appropriate still have to comprise functional groups. The use of ketones comprising aromatic moieties is not described even though resins prepared therefrom have properties in their practical application which are at least as good. This peculiar fact can now be explained in light of our own tests, which have revealed that ketones comprising aromatic moieties, other synthesis conditions being the same, on addition of ammonium chloride as employed in the examples of EP-PS No. 7 106, will result in resins having low softening points.

OBJECTS OF THE INVENTION

One object of the present invention is to provide alkyl aryl ketone/formaldehyde resins having significantly higher softening points than those which were obtainable using prior art methods of preparation.

Another object of the invention is to provide a method of preparing alkyl aryl ketone/formaldehyde resins which results in high conversion of the ketone compound, i.e., higher than 95%.

A further object of the invention is to provide hydrogenated alkyl aryl ketone/formaldehyde resins having softening points which are about 10°-40° C. higher than similar prior art resins.

Upon further study of the specification and appended claims, further objects and advantages of this invention will become apparent to those skilled in the art.

SUMMARY OF THE INVENTION

These objects are attained according to the present invention by providing an alkyl aryl ketone/formaldehyde resin having a softening point, determined by the melting point/capillary method on a powdered sample, of at least 80° C., preferably higher.

In a process aspect, the invention provides an improved method of preparing the foregoing resins, wherein a quaternary benzyl ammonium or phosphonium salt is added as an activator to the mixture of ketone, formaldehyde and alkali used to prepare the resin.

DETAILED DISCUSSION

The activator added to the polycondensation mixture, according to the invention, has the formula (A)

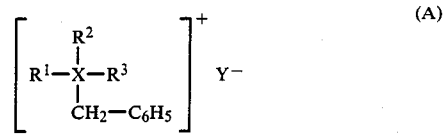

wherein X is a nitrogen or phosphorus atom; $R^1$, $R^2$ and $R^3$ are each independently a $C_{1-3}$-alkyl group or a phenyl group; and $Y-$ is the anion of an organic or inorganic acid.

Quaternary ammonium salts having $C_{1-3}$-alkyl groups as $R^1$, $R^2$ and $R^3$, in particular those wherein $R^1$, $R^2$ and $R^3$ are each $C_{1-2}$-alkyl, are preferred.

Preferred activators include quaternary ammonium salts, e.g., trimethylbenzylammonium chloride, trimethylbenzylammonium iodide, triethylbenzylammonium chloride and triethylbenzylammonium iodide, and quaternary phosphonium salts, e.g., triphenylbenzylphosphonium chloride and triphenylbenzylphosphonium iodide.

Suitable anions, $Y-$, can be anions of any protic acid, preferably anions of strong (in)organic acids including, e.g., $Cl-$, $Br-$, $I-$ and the like, the halides being preferred. Other possible anions are hydrogensulfate- or mesylate-ions.

According to the process of the invention, the activator is employed in amounts of 0.05-5, preferably 0.1-1.0, and more preferably 0.25-1 weight %, based on the weight of alkyl aryl ketone employed in the polycondensation mixture.

Strongly basic compounds, e.g., alkali metal hydroxides, in particular NaOH and/or KOH, are employed as catalysts for the polycondensation, in addition to the activator. The basic catalysts are normally employed in amounts of at least 1 mol %, preferably at least 5 mol %, more preferably at least 10 mol %, based on the alkyl aryl ketone, in the reaction mixture.

Suitable alkyl aryl ketones for use in the process of the invention include acetophenone and acetophenones alkylated in the nucleus, e.g., methyl tolyl ketone and acetylethylbenzene; alkyl phenyl ketones having $C_{2-6}$-alkyl chains, e.g., propiophenone and butyrophenone; and alkyl $C_{6-10}$-aryl ketones, e.g., methyl napthyl ketone and acetyltetrahydronaphthalene. Generally, any $C_{1-6}$-alkyl $C_{6-10}$-aryl ketone can be used.

The alkyl aryl ketones are converted by condensation with formaldehyde or optionally formaldehyde-releasing compounds, e.g., paraformaldehyde. It will be understood that the term "formaldehyde" as used herein includes the latter compounds as well. The molar ratio of alkyl aryl ketone to formaldehyde is in the range 0.9-1.3, preferable 0.95-1.1. Formaldehyde is conveniently used as a commercially available 30% aqueous solution. The condensation reaction, except for the special quaternary ammonium or phosphonium activator used during synthesis, is effected under conventional conditions, e.g., those disclosed in DE-PS No. 892 975. The reaction is effected in the liquid phase, normally in the presence of a solubilizing agent, e.g., a lower alcohol, such as metanol. The amount of solubilizing agent is generally about 10–25% by volume, relative to the total volume of ketone, formaldehyde and base.

The reaction is generally effected at elevated temperatures, e.g. 70°–100° C., advantageously at reflux, and at ambient pressure. Preferably, the condensation is effected in an inert gas atmosphere, e.g., nitrogen, argon and the like.

The product is isolated conventionally, e.g., by decanting the supernatant aqueous phase; washing the resin, optionally dissolved in an organic solvent, e.g., methylene chloride, with deionized water until a recovered sample is clear; and evaporating excess solvent, advantageously under reduced pressure.

Compared with the corresponding alkyl aryl ketone/formaldehyde resins prepared by conventional processes, the resins prepared according to the invention, using a given alkali content during the synthesis, have softening points which are higher by about 30° C. Whereas conventional alkyl aryl ketone/formaldehyde resins have softening points of less than 80° C., the resins prepared according to the invention have softening points of at least 80° C., preferably at least 90° C.; the softening points are generally not higher than about 110° C.

The molecular weights of the resins of the invention are also higher than those of the corresponding prior art resins. Prior art resins normally have average molecular weights lower than about 800 daltons, whereas resins according to the invention have molecular weights of at least 800 daltons, preferably at least 800 daltons, more preferably at least 1000 daltons, generally up to about 2000 daltons. This combination of higher softening temperature and higher molecular weight distinguishes the resins of the invention from prior art resins prepared by similar processes which, however, do not include use of an activator of formula (A).

The process of the invention has the further advantage that high conversions of alkyl aryl ketone are achieved, e.g., at least 95%, preferably higher than 95%, more preferably higher than 96%.

The alkyl aryl ketone/formaldehyde resins according to the invention may be catalytically hydrogenated to produce resins of modified solubilities, i.e., improved ethanol solubility, as described, e.g., in DE-PS No. 870 022 or DE-OS No. 32 41 735 (corresponding to U.S. Ser. No. 550,461, now U.S. Pat. No. 4,542,194), the result being once again resins which, compared with the corresponding prior art products, have softening points which are higher by 10°–40° C. Since example 3 of DE-PS No. 870,022 exhibits a softening point of 100° C., the softening point of the hydrogenated product of this invention is necessarily at least 110° C., with the upper limit being 160° C.

The softening points are determined by the melting point/capillary method (heating rate=1° C./min). The determination is effected by placing a sample of powdered resin in a glass melting point capillary, immersing the capillary in a stirred oil bath, and heating the bath at the indicated rate. The softening point is taken as the bath temperature at which a powdered sample is sintered together and becomes transparent. It is to be noted that the data so obtained are lower by about 5°–10° C. than when determined according to DIN No. 53 180 or according to Kramer/Sarnov/Nagel (cf. Karsten, Lackrohstofftabelle, 7th edition (1981)—page 50).

The resins according to the invention are excellently suitable as additives for coating agents; they may also be employed in the manufacture of ball point ink pastes, printing dyes, inks, polishes and the like. For example, a typical coating agent, useful for coating of metal or wood can contain 5–50% by weight—related to the binder—of a resin according to the invention. Besides these resins the coating compositions contain usual ingredients as additional binders, pigments, plasticizers, solvents and the like.

The hydrogenated resins according to the invention are useful, especially in the light of their higher softening points, as ball paint inks, printing dyes, inks or polishes.

Typical compositions useful for
(A) ball point inks contain 100% by weight
(B) printing dyes contain 20–70% by weight
(C) ink compositions contain 100% by weight
(D) polishing furniture contain 10–50% by weight
(all data related to the binding agent) of a hydrogenated resin according to the invention. Besides these resins the compositions contain usual components, e.g., additional binders, pigments, dyes, solvents and the like.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES 1–6 AND COMPARATIVE EXAMPLES A–D

Production of alkyl aryl ketone/formaldehyde resins

Ten resins are prepared using the following general procedure. Examples 1–6 conform to the process of the invention except that examples 4 and 6 result in resins having softening points less than 90° C. Examples A–D are not in accordance with the process of the invention. Other deviations from the procedure are indicated in footnotes to the Table.

600 g acetophenone, 170 ml methanol as solubilizing agent, 180 ml of an aqueous 30% by weight formaldehyde solution and the indicated activator (Table)/are introduced into an agitator flask. The mixture is heated with agitation to 50° C. This is followed by the dropwise addition, over the course of 25–30 minutes with further agitation, of an aqueous 50% by weight NaOH solutiion (KOH in Ex. 5), the reaction mixture as a result being heated to a reflux temperature of 84° C. This is followed by the dropwise addition, over the course of 1.5 hours, of a further 298 ml of the aqueous formaldehyde solution, and the mixture is then maintained under reflux for a further 2 hours. After cooling, the aqueous phase which is supernatant above the resin is separated, the residue is dissolved in methylene chloride (Exs. 1–6), and the organic phase is washed with completely deionized water until a fully worked-up sample of resin is devoid of cloudiness. Finally, the excess solvent is evaporated off under reduced pressure, eventually at a vacuum of 4 mbar and a maximum temperature of 160° C. The properties of the resultant resins are shown in the Table. The molecular weights were determined by vapor pressure osmometry in chlorobenzene, according to the procedure, e.g., described in A. Weissberger (Editor)—Physical Methods of Organic Chemistry, Vol. I—Part I, p. 887—Interscience Publishers, N.Y. (1965).

TABLE

| Example | NaOH (Mol/Mol Acetophenone) | Activator[4] | [% by weight][5] | Acetophenone Conversion [%] | Molecular Weight (daltons) | Softening temperature [°C.] |
| --- | --- | --- | --- | --- | --- | --- |
| 1 | 0.25 | TMBAC | 1 | >96 | 1060 | 98 |
| 2 | 0.25 | TMBAC | 0.5 | >95 | 1100 | 94 |
| 3 | 0.25 | TEBAC | 0.5 | >96 | 1210 | 98 |
| 4 | 0.025 | TEBAC | 1.0 | >96 | 1030 | 87 |
| 5[1] | 0.25 | TEBAC | 0.25 | >96 | 1060 | 100 |
| 6 | 0.25 | BTPPC | 0.5 | >96 | 830 | 80 |
| A[2] | 0.25 | — | — | >96 | 650 | 65 |
| B[2][3] | 0.25 | — | — | 89 | 760 | 81 |
| C[2] | 0.25 | TCMAC | 1.2 | >96 | 440 | 56 |
| D[2] | 0.25 | TCMAC | 5.0 | >95 | 450 | 56 |

[1]KOH was used instead of NaOH as the base.
[2]The NaOH was washed out with fully deionized water (without methylene chloride).
[3]The reaction mixture contained isopropanol instead of methanol as a solubilizing agent.
[4]TMBAC: Trimethylbenzylammonium chloride TEBAC: Triethylbenzylammonium chloride BTPPC: Benzyltriphenylphosphonium chloride TCMAC: Tricaprylmethylammonium chloride
[5]Weight-% relative to the weight of acetophenone.

EXAMPLE 7 AND COMPARATIVE EXAMPLE E

Production of hydrogenated resins 165 g of the resin produced according to the procedure of Example 1 is dissolved in 385 g of isobutanol, transferred into a 1 liter longitudinal stroke autoclave, containing 50 g of a technical copper catalyst activated with chromium. Hydrogenation is effected at a temperature of 135° C. and a pressure of 300 bar until the termination of hydrogen uptake. The catalyst is filtered off and the isobutanol is distilled off, yielding a light-colored water-clear resin which is soluble in ethanol and has a softening point of 136° C.

The product produced according to Example A is hydrogenated using the procedure of Example 7. The resultant resin, which is soluble in ethanol, has a softening point of 106° C.

EXAMPLE 8

Typical compositions using resins (A) An illustrative coating agent according to the invention composition for use in coating of wood contains:
10 wt. parts of the resin of Example [1–6];
15 wt. parts of nitrocellulose
4 wt. parts of dibutyl phthalate
18 wt. parts of ethanol
15 wt. parts of butyl acetate
20 wt. parts of ethyl acetate
5 wt. parts of butanol
3 wt parts of ethyl glycol
10 wt. parts of toluene (B) An illustrative coating agent according to the invention for use in coating of metal contains:
4.9 wt. parts of the resin of Example [1–6];
15.7 wt. parts of vinylchloride/maleic acid butylester/maleic acid-terpolymerisate
2 wt. parts of dioctyl phthalate
0.3 wt. parts of EPICOTE ®828
11.2 wt. parts of xylene
35.1 wt. parts of SOLVESSO ®100
3.8 wt. parts of butyl acetate
7.6 wt. parts of a mixture of 10 wt. parts of BENTONE ® in 90 wt. parts of xylene
4.5 wt. parts of talc
14.9 wt. parts of titandioxide

EXAMPLE 9

Typical compositions using hydrogenated resin (A) An illustrative ball point ink paste according to the invention contains:
30 wt. parts of the hydrogenated resin of Example 7;
30 wt. parts of phenoxiethanol
20 wt. parts of benzylic alcohol
10 wt. parts of butyl diglycol
10 wt. parts of a soluble dye (B) An illustrative printing dye composition according to the invention contains:
8 wt. parts of the hydrogenated resin of Example 7
10 wt. parts of nitrocellulose
2 wt. parts of dioctyl phthalate
10 wt. parts of an organic pigment
20 wt. parts of ethyl acetate
15 wt. parts of butyl acetate
30 wt. parts of ethanol
5 wt. parts of butanol (C) An illustrative ink composition according to the invention contains:
3 wt. parts of the hydrogenated resin of Example 7
2 wt. parts of a soluble dye
10 wt. parts of ethyl diglycol
7 wt. parts of diethylene glycol
8 wt. parts of ethanol
70 wt. parts of water (D) An illustrative composition according to the invention, suitable for polishing furniture:
8 wt. parts of the hydrogenated resin of Example 7
15 wt. parts of nitrocellulose
2 wt. parts of an urea/formaldehyde-resin
2 wt. parts of dioctyl phthalate
4 wt. parts of paraffinic oil
5 wt. parts of butyl acetate
10 wt. parts of ethyl acetate
31 wt. parts of ethanol
3 wt. parts of ethyl glycol
14 wt. parts of xylene
6 wt. parts of butanol The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A $C_{1-6}$-alkyl $C_{6-10}$-aryl ketone/formaldehyde resin having a softening point of at least 90° C.

2. A resin according to claim 1, having a molecular weight of at least 800 daltons as determined by vapor pressure osmometry in chlorobenzene.

3. A resin according to claim 1, which is obtained by polycondensation of a $C_{1-6}$-alkyl $C_{6-10}$-aryl ketone with formaldehyde in liquid phase, in the presence of an alkali metal hydroxide base, and in the further presence of a quaternary ammonium or phosphonium activator having the formuls $[R^1R^2R^{3XCH_2C_6H_5}]_+Y-$, wherein X is a nitrogen or phosphorus atom; $R^1$, $R^2$ and $R^3$ are each independently a $C_{1-3}$-alkyl group or a phenyl group; and $Y-$ is the anion of an inorganic or organic acid.

4. A hydrogenated alkyl aryl ketone/formaldehyde resin, produced by high pressure hydrogenation of a resin according to claim 1; wherein said hydrogenated resin has a softening point of 110°-160° C.

5. In a coating agent composition, ball point ink paste, printing dye, ink or polish, comprising an alkyl aryl ketone/formaldehyde resin, the improvement wherein said resin is a resin according to claim 4.

6. In a liquid phase process for producing an alkyl aryl ketone/formaldehyde resin, wherein an alkyl aryl ketone is polycondensed with formaldehyde in a molar ratio of 0.9:1 to 1.3:1 in liquid phase, in the presence of an alkali metal hydroxide, the improvement wherein said polycondensation is effected in the presence of a quaternary ammonium or phosphonium activator having the formula $[R^1R^2R^3XCH_2C_6H_5]_+Y-$, wherein X is a nitrogen or phosphorus atom; $R^1$, $R^2$ and $R^3$ are each independently a $C_{1-3}$-alkyl group or a phenyl group; and $Y-$ is the anion of an inorganic or organic acid; and wherein the amount of said activator is 0.05-5% by weight, relative to the weight of said ketone.

7. A process according to claim 6, wherein X is a nitrogen atom.

8. A process according to claim 7, wherein $R^1$, $R^2$ and $R^3$ are each independently $C_{1-3}$-alkyl.

9. A process according to claim 6, wherein X is a phosphorus atom.

10. A process according to claim 6, wherein the amount of said activator is 0.1-1% by weight, relative to the weight of said ketone.

11. A process according to claim 10, wherein said amount is 0.25-1% by weight.

12. A process according to claim 8, wherein said activator is benzyltrimethylammonium chloride.

13. A process according to claim 8, wherein said activator is benzyltriethylammonium chloride.

14. A process according to claim 6, wherein said molar ratio is 0.95:1 to 1.1:1.

15. A process according to claim 6, wherein at least 95% of said ketone is converted.

16. A process according to claim 6, wherein said polycondensation is effected at a temperature of 70°-100° C.

17. A process according to claim 6, wherein said ketone is a $C_{1-6}$-alkyl $C_{6-10}$-aryl ketone.

18. A hydrogenated alkyl aryl ketone/formaldehyde resin having a softening point of 110°-160° C., produced by a process wherein an alkyl aryl ketone/formaldehyde resin is catalytically hydrogenated at high pressure, and wherein said alkyl aryl ketone/formaldehyde resin is produced according to the process of claim 6.

19. A composition according to claim 5, said composition being a ballpoint ink paste.

20. A composition according to claim 5, being a printing dye composition.

21. A composition according to claim 5, being a polishing composition.

22. A hydrogenated resin according to claim 18, wherein the alkyl aryl ketone/formaldehyde resin is produced by a process wherein the molar ratio of ketone: formaldehyde is 0.95:1–1.1:1, the amount of activator is 0.25–1% by weight relative to the weight of the ketone, the activator is benzyltriethylammonium chloride or benzyltrimethylammonium chloride, and the reaction is conducted at 70°-100° C.

23. An alkyl aryl ketone/formaldehyde resin produced by the process of claim 6 and having a softening point of at least 90° C.

24. An alkyl aryl ketone/formaldehyde resin according to claim 1, which is essentially sulfur-free.

25. In a coating agent composition, ball point ink paste, printing dye, ink or polish, comprising an alkyl aryl ketone/formaldehyde resin, the improvement wherein said resin is a resin according to claim 1.

26. A composition comprising a $C_1$-$C_6$-alkyl $C_6$-$C_{10}$-aryl ketone, formaldehyde, an alkali metal hydroxide, and a quaternary ammonium or phosphonium activator having the formula $[R^1R^2R^3XCH_2C_6H_5]_+Y-$, wherein X is a nitrogen or phosphorus atom; $R^1$, $R^2$ and $R^3$ are each independently a $C_{1-3}$-alkyl group or a phenyl group; and $Y-$ is the anion of an inorganic or organic acid, the molar ratio of the ketone to formaldehyde being 0.9:1 to 1.3:1 and the activator being present in a concentration of 0.05-5% by weight relative to the ketone.

* * * * *